United States Patent
Xia et al.

(10) Patent No.: US 10,650,236 B2
(45) Date of Patent: May 12, 2020

(54) ROAD DETECTING METHOD AND APPARATUS

(71) Applicant: Baidu Online Network Technology (Beijing) Co., Ltd., Beijing (CN)

(72) Inventors: Yuan Xia, Beijing (CN); Yehui Yang, Beijing (CN); Haishan Wu, Beijing (CN); Jingbo Zhou, Beijing (CN); Chao Li, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 111 days.

(21) Appl. No.: 15/883,574

(22) Filed: Jan. 30, 2018

(65) Prior Publication Data
US 2018/0300549 A1  Oct. 18, 2018

(30) Foreign Application Priority Data
Apr. 12, 2017 (CN) .......................... 2017 1 0236522

(51) Int. Cl.
 G06K 9/00  (2006.01)
 G06K 9/66  (2006.01)
 G06K 9/46  (2006.01)
 G06K 9/62  (2006.01)

(52) U.S. Cl.
 CPC ........... G06K 9/00651 (2013.01); G06K 9/66 (2013.01); G06K 9/4609 (2013.01); G06K 9/6277 (2013.01)

(58) Field of Classification Search
 None
 See application file for complete search history.

(56) References Cited

U.S. PATENT DOCUMENTS

| 2015/0071528 A1* | 3/2015 | Marchisio ............... G06F 16/29 382/159 |
| 2017/0010105 A1* | 1/2017 | Gdalyahu .............. G01C 21/32 |
| 2017/0039436 A1* | 2/2017 | Chen .................. G06K 9/00798 |

FOREIGN PATENT DOCUMENTS

CN  102521973 A  6/2012

OTHER PUBLICATIONS

Zilong Zhong et al.; "Fully Convolutional Networks for Building and Road Extraction: Preliminary Results"; 2016 IEEE International Geoscience and Remote Sensing Symposium (IGARSS); Jul. 10-15, 2016; pp. 1591-1594 (4 pages); ISSN: 2153-7003.

* cited by examiner

*Primary Examiner* — Hadi Akhavannik
(74) *Attorney, Agent, or Firm* — Nixon Peabody LLP (57) ABSTRACT

A road detection method and apparatus. A specific embodiment of the method includes: acquiring an image of a predetermined region; semantically segmenting the image to acquire a first probability that a region corresponding to each pixel in the image is a road region; acquiring a historical position information set of a target terminal; correcting, in response to historical position information existing in the historical position information set, the historical position information indicating a historical position located in the predetermined region, the first probability according to the historical position information to obtain a second probability; and determining a region corresponding to a pixel having the second probability greater than a preset threshold as a road region. Such an embodiment improves the road detection accuracy.

11 Claims, 5 Drawing Sheets

ROAD DETECTING METHOD AND APPARATUS

CROSS-REFERENCE TO RELATED APPLICATION

This application is related to and claims priority from Chinese Application No. 201710236522.5, filed on Apr. 12, 2017 and entitled "Road Detection Method and Apparatus", the entire disclosure of which is hereby incorporated by reference.

TECHNICAL FIELD

The present disclosure relates to the field of computer technology, in particular to a road detection method and apparatus.

BACKGROUND

With the rapid economic development, the ground objects, especially the roads, are expanding very rapidly. Updating a road network in a map is of great significance in the fields of economic construction, military and earthquake relief. At present, there are mainly two ways for discovering roads, one is manual collection, for example, a cruiser can collect and capture current road information and surrounding environment information; the other is road detection by applying image processing and computer visualization methods through acquisition of satellite or aerial remote sensing images.

However, the manual data collection is inefficient. In the case of detecting a road through acquired satellite image information, the road detection accuracy will be impacted by severely obstructed roads (such as the clouds and the shadows of roadside trees).

SUMMARY

An objective of the present disclosure is to propose an improved road detection method and apparatus so as to solve the technical problems as mentioned in the background.

In a first aspect, an embodiment of the present disclosure provides a road detection method. The method comprises: acquiring an image of a predetermined region; semantically segmenting the image to acquire a first probability that a region corresponding to each pixel in the image is a road region; acquiring a historical position information set of a target terminal; correcting, in response to historical position information existing in the historical position information set, the historical position information indicating a historical position located in the predetermined region, the first probability according to the historical position information to obtain a second probability; and determining a region corresponding to a pixel having the second probability greater than a preset threshold as a road region.

In the embodiment, the semantically segmenting the image to acquire a first probability that a region corresponding to each pixel in the image is a road region may comprise: importing the image into a pre-trained fully convolutional network model to obtain a third probability that a region corresponding to each pixel in the image is a road region; and determining the first probability according to the third probability and a pre-trained conditional random field model with each pixel in the image as a node in a conditional random field and a relation between pixels in the image as an edge in the conditional random field.

In the present embodiment, the historical position information may include a coordinate information uploaded by the target terminal within a predetermined period; and the correcting the first probability according to the historical position information to obtain a second probability may comprise: counting the quantity of coordinate points as indicated by the coordinate information included in a region corresponding to each pixel in the image; determining a fourth probability that the region corresponding to each pixel in the image is a road region according to the quantity; and weighting the first probability and the fourth probability of the each pixel according to a preset weight to obtain the second probability of the each pixel.

In the present embodiment, the counting the quantity of coordinate points as indicated by the coordinate information included in a region corresponding to each pixel in the image may comprise: establishing a distribution map of the coordinate points according to the coordinate information; performing image filtering and denoising on the distribution map to obtain a non-noise coordinate point in the distribution map; and counting the quantity of non-noise coordinate points included in the region corresponding to each pixel in the image.

In the present embodiment, the acquiring a historical position information set of a target terminal may comprise: acquiring a position information set uploaded when a preset process and/or a preset thread in the target terminal are started, wherein the preset process and the preset thread are used for realizing a navigation function.

In a second aspect, an embodiment of the present disclosure provides a road detection apparatus. The apparatus comprises: a first acquisition unit, configured for acquiring an image of a predetermined region; a semantic segmentation unit, configured for semantically segmenting the image to acquire a first probability that a region corresponding to each pixel in the image is a road region; a second acquisition unit, configured for acquiring a historical position information set of a target terminal; a correction unit, configured for correcting, in response to historical position information existing in the historical position information set, the historical position information indicating a historical position located in the predetermined region, the first probability according to the historical position information to obtain a second probability; and a determination unit, configured for determining a region corresponding to a pixel having the second probability greater than a preset threshold as a road region.

In the present embodiment, the semantic segmentation unit may comprise: a fully convolutional network model subunit, configured for importing the image into a pre-trained fully convolutional network model to obtain a third probability that a region corresponding to each pixel in the image is a road region; and a conditional random field model subunit, configured for determining the first probability according to the third probability and a pre-trained conditional random field model with each pixel in the image as a node in a conditional random field and a relation between pixels in the image as an edge in the conditional random field.

In the present embodiment, the historical position information may include a coordinate information uploaded by the target terminal within a predetermined period; and the correction unit may comprise: a counting subunit, configured for counting the quantity of coordinate points as indicated by the coordinate information included in a region corresponding to each pixel in the image; a determination subunit, configured for determining a fourth probability that the region corresponding to each pixel in the image is a road region according to the quantity; and a weighting subunit, configured for weighting the first probability and the fourth probability of the each pixel according to a preset weight to obtain the second probability of the each pixel.

In the present embodiment, the counting subunit may comprise: an establishment module, configured for establishing a distribution map of the coordinate points according to the coordinate information; a filtering module, configured for performing image filtering and denoising on the distribution map to obtain a non-noise coordinate point in the distribution map; and a counting module, configured for counting the quantity of non-noise coordinate points included in the region corresponding to each pixel in the image.

In the present embodiment, the second acquisition unit may be further configured for acquiring a position information set uploaded when a preset process and/or a preset thread in the target terminal are started, wherein the preset process and the preset thread are used for realizing a navigation function.

In a third aspect, an embodiment of the present disclosure provides a device comprising: one or more processors; and a storage configured for storing one or more programs, the one or more programs, when being executed by the one or more processors, cause the one or more processors to perform the method as described in the first aspect.

In a fourth aspect, an embodiment of the present disclosure provides a computer readable storage medium storing a computer program, wherein the program, when executed by a processor, causes the processor to perform the method as described in the first aspect.

With the road detection method and apparatus as provided in the embodiments of the present disclosure, the road detection accuracy is improved by acquiring an image of a predetermined region; semantically segmenting the image to acquire a first probability that a region corresponding to each pixel in the image is a road region; acquiring a historical position information set of a target terminal; correcting, in response to historical position information existing in the historical position information set, the historical position information indicating a historical position located in the predetermined region, the first probability according to the historical position information to obtain a second probability; and lastly determining a region corresponding to a pixel having the second probability greater than a preset threshold as a road region.

BRIEF DESCRIPTION OF THE DRAWINGS

Other features, objects and advantages of the present disclosure will become more apparent by reading the detailed description about the non-limiting embodiments with reference to the following drawings.

DETAILED DESCRIPTION OF EMBODIMENTS

The present application is further described in detail through the accompanying drawing and the embodiment. It should be understood that, the specific embodiments described herein are merely used to explain the relevant invention, and are not intended to limit the present invention. In addition, it should be further noted that, in order to facilitate the description, merely the parts related to the relevant invention are shown in the accompanying drawings.

It should be noted that, the embodiments of the present application and features in the embodiments may be combined on a non-conflict basis. The present application will be described in detail through the accompanying drawings and the embodiments.

Figure 1:
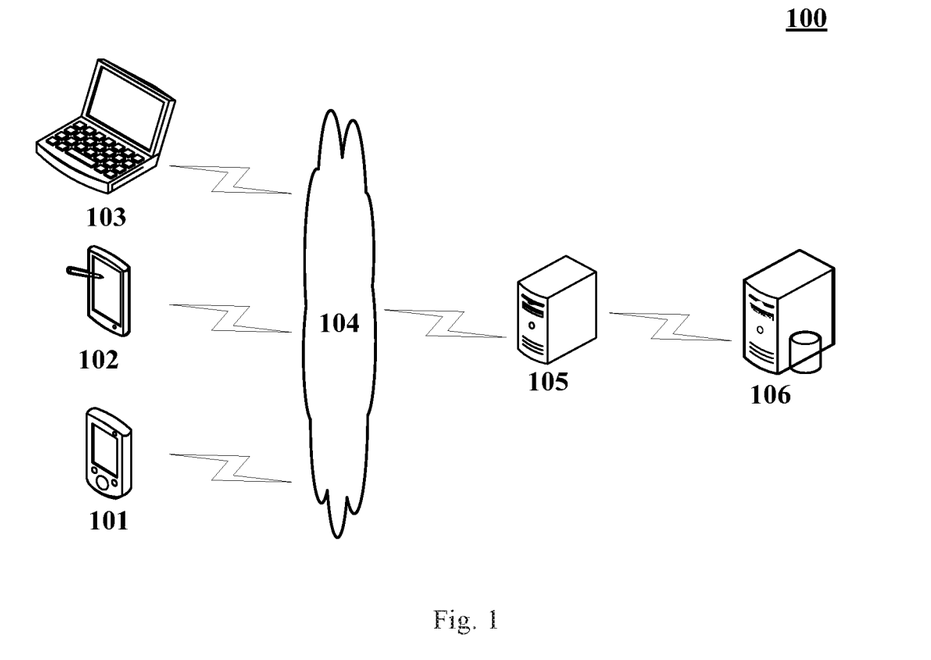
FIG. 1 is an exemplary system architecture to which the present disclosure may be applied.

FIG. 1 illustrates an exemplary system architecture 100 to which the road detection method or apparatus according to an embodiment of the present application can be applied.

As shown in FIG. 1, the system architecture 100 may include terminal devices 101, 102 and 103, a network 104, a server 105, and a database 106. The network 104 serves as a medium for providing communication links between the terminal devices 101, 102 and 103 and the server 105. The network 104 may include various types of connections, such as wired and wireless communication links or optical fiber cables.

The user may use the terminal devices 101, 102 and 103 to interact with the server 105 through the network 104, in order to transmit or receive messages, etc. The terminal devices 101, 102 and 103 may be installed with various communication client applications, such as, map applications, e-business applications, communication applications, and searching applications.

The terminal devices 101, 102, and 103 may be various electronic devices having positioning functions and communication functions that may send position information to a server, and/or various electronic devices with display functions and communication functions that may receive and display route data from a server, the devices including but not limited to smart phone, tablet, laptop computer and desktop computer.

The server 105 may be a server that provides various services, for example, a server that provides a route data update service for a map application installed on the terminal devices 101, 102, and 103. Such a processing server is capable of acquiring an image of a predetermined region from a database 106; semantically segmenting the image to acquire a first probability that a region corresponding to each pixel in the image is a road region; acquiring a historical position information set of the terminal devices 101, 102 and 103; correcting, in response to historical position information existing in the historical position information set, the historical position information indicating a historical position located in the predetermined region, the first probability according to the historical position information to obtain a second probability; and determining a region corresponding to a pixel having the second probability greater than a preset threshold as a road region.

The database 106 may be a storage unit storing texts, images, historical position information of a terminal or route data. An image stored in the database 106 may be a satellite or aerial image or other unprocessed image, and may be a processed picture.

It should be noted that the road detection method as provided by the present embodiment of the present disclosure may be executed by the server 105. Correspondingly, a road detection apparatus may be provided in the server 105.

It should be understood that the numbers of the terminal devices, networks, servers and databases in FIG. 1 are merely illustrative. There may be any number of terminal devices, networks, servers and databases depending on the implementation needs.

Figure 2:
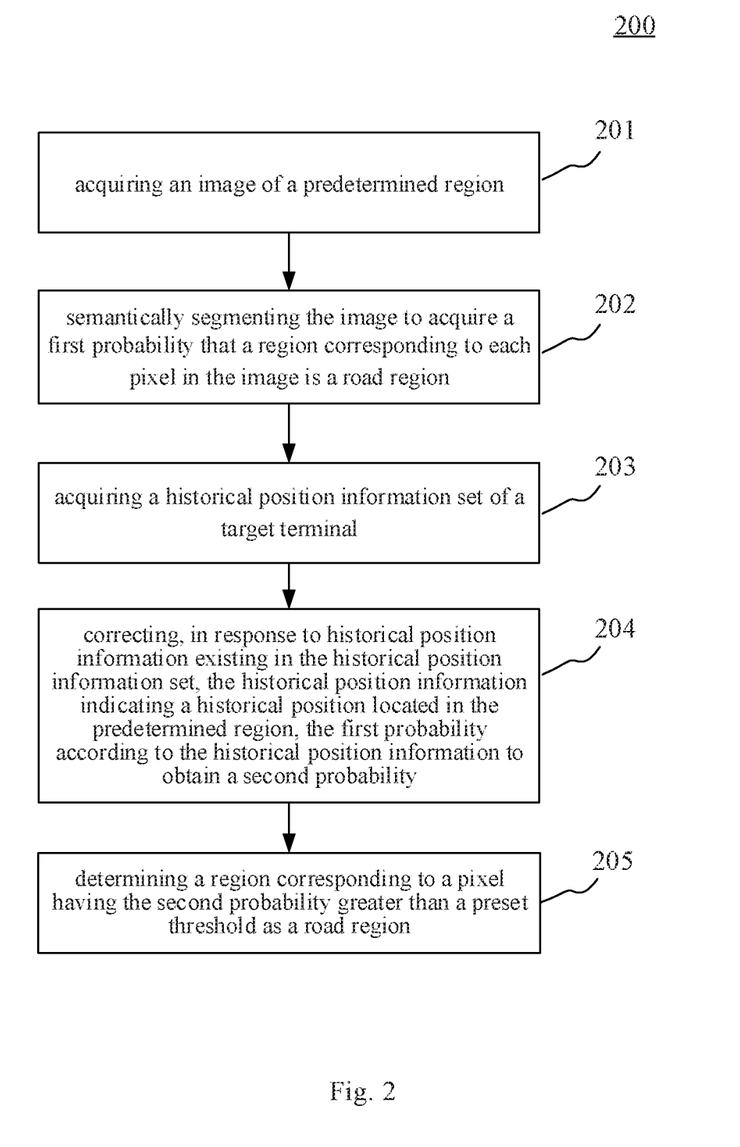
FIG. 2 is a schematic flowchart of an embodiment of a road detection method according to the present disclosure.

Referring further to FIG. 2, a flow 200 of one embodiment of a road detection method according to the present disclosure is shown. The road detection method comprises the following steps:

Step 201: acquiring an image of a predetermined region.

In the present embodiment, an electronic device (for example, a server as shown in FIG. 1) on which the road detection method is applied may acquire an image of a predetermined region first. The image may be a satellite image or other aerial image. The satellite image usually consists of hierarchical map tiles, each of which is a 256× 256 image. The map tile may be divided into 19 levels, map tiles with different levels have different ground resolutions, and a map tile to be used may depend on the actual needs. As an example, a level-17 map tile may be used, and a pixel of the level-17 map tile in a image is corresponding to 2 meters. The predetermined region may be a target region for this road detection or may be a part of the target region. For example, after it is determined that a level-17 map tile is used, a map tile of the target region may be acquired according to coordinate information of the target region. When the target region is large, a plurality of level-17 map tiles may be acquired, and the predetermined region may be a region corresponding to one or more from such map tiles. The predetermined region may be city, countryside, mountain and some dangerous regions.

Step 202: semantically segmenting the image to acquire a first probability that a region corresponding to each pixel in the image is a road region.

In the present embodiment, the electronic device may perform semantic segmentation on the image acquired in step 201 to obtain a first probability that a region corresponding to each pixel in the image is a road region. The image segmentation is segmenting an image into a number of specific regions with unique properties, and is a critical step from image processing to image analysis. The existing image segmentation methods are mainly divided into the following categories: threshold-based segmentation, region-based segmentation, edge-based segmentation and segmentation based on a particular theory. The semantic segmentation on image, in simple terms, is giving a picture and classifying each pixel point in the picture. For road detection, a value of a probability that each pixel point in a satellite image belongs to a road may be determined by judging a range in which a color value of the pixel point is. In the field of deep learning, a multi-layer neural network model such as deep neural network and convolutional neural network may be used to semantically segment an image.

Step 203: acquiring a historical position information set of a target terminal.

In the present embodiment, the electronic device may acquire a historical position information set of a target terminal. The target terminal may be a terminal installed with a preset application or a terminal willing to share the position information thereof with a server. The predetermined application may be an application with a navigation function or other application that has the permission to obtain the position information of the terminal. The historical position information set of the target terminal may be a set of the position information that the target terminal has uploaded in the past period from a background server of such applications. Alternatively, the historical position information may include longitude and latitude information. If the historical position information is data produced when a user starts a navigation, the historical position information may also include movement direction information of a target terminal located at the historical position. The historical position information set may be a set of information acquired after desensitizing the data uploaded by the target terminal. For example, user-sensitive information such as user identification information as included in the historical position information may be removed.

Step 204: correcting, in response to historical position information existing in the historical position information set, the historical position information indicating a historical position located in the predetermined region, the first probability according to the historical position information to obtain a second probability.

In the present embodiment, the electronic device may correct, in response to historical position information existing in the historical position information set acquired in Step 203, the historical position information indicating a historical position located in the predetermined region, the first probability according to the historical position information to obtain a second probability. The position information in the historical position information set may not be in a one-to-one correspondence with the predetermined region. Therefore, historical position information in the historical position information set that an indicated historical position is located in the predetermined region may be determined first, and then the first probability is corrected according to the determined historical position information to obtain a second probability.

Step 205: determining a region corresponding to a pixel having the second probability greater than a preset threshold as a road region.

In the present embodiment, the electronic device may determine a region corresponding to a pixel having the second probability obtained in step 204 and greater than a preset threshold as a road region. For example, in some alternative implementations, the preset threshold may be empirically set (schematically, set to be 0.5, for example), and a region corresponding to a pixel having the second probability greater than 0.5 is determined as a road region. Alternatively, in other alternative implementations, the preset threshold may also be obtained with a machine-based learning method. For example, route data verified in map software may be used as training data to train a threshold generation model so as to obtain the optimal preset threshold by training. The present embodiment combines the advantages of the road detection based on an image segmentation result and historical position information, and improves the road detection accuracy.

In some alternative implementations of the present embodiment, the semantically segmenting the image to acquire a first probability that a region corresponding to each pixel in the image is a road region comprises: importing the image into a pre-trained fully convolutional network model to obtain a third probability that a region corresponding to each pixel in the image is a road region; and determining the first probability according to the third probability and a pre-trained conditional random field model with each pixel in the image as a node in a conditional random field and a relation between pixels in the image as an edge in the conditional random field.

In the present embodiment, a level-17 image segmentation tag subject to grid rasterization may be used. With a framework based on deep learning, an efficient road image segmentation model based on a full convolutional network is trained with a large amount of satellite image data as a support and the verified network data in the map software as training data. Compared with the traditional convolutional neural network model, the full convolutional network model eliminates a fully connected layer from a network structure and greatly reduces the model parameters. At the same time, the image segmentation is transformed into a pixel-wise prediction problem with an upsampling method, which saves the calculation time compared with the traditional patch-wise method. And then, a processing result may be further optimized with a conditional random field algorithm and an image enhancement method.

In some alternative implementations of the present embodiment, the acquiring a historical position information set of a target terminal comprises: acquiring a position information set uploaded when a preset process and/or a preset thread in the target terminal are started, wherein the preset process and the preset thread are used for realizing a navigation function.

In the present implementation, road discovery and detection are performed based on the trajectory data generated when a terminal turns on a navigation function. When a user travels, the user will use a map navigation function to plan a route. At the same time, map-based software will record the corresponding trajectory data when the navigation is enabled. Different types of roads can be detected with the trajectory data produced by different types of navigations. For example, navigation data associated with driving may be used for detecting a vehicle road, navigation data associated with riding may be used for detecting a bicycle road, and navigation data associated with walking may be used for detecting a walking road. The trajectory data generated by navigation is more relevant to the road detection than the position data generated by other functions, as a user is more likely to upload position information in an off-road region while other functions are running. The use of the position information acquired when a navigation function is enabled further improves the road detection accuracy.

In some alternative implementations of the present embodiment, whether a region corresponding to each pixel in an image is a road may depend on whether the quantity of historical positions included in the region corresponding to each pixel in the image is greater than a preset quantity threshold, the quantity threshold may be determined according to an average of the historical positions included in each pixel in the predetermined region. For example, the average is 6, the quantity threshold may be 9, and the actual value may depend on an aggregation extent of historical positions in the predetermined region. The quantity threshold may also be obtained by training with a machine-based learning method with the verified network data in the map software as training data. Due to the accuracy or stability of a positioning system, there may be some erroneous historical position information in the historical position information set. For example, a positioning point may have a drift phenomenon. Therefore, such erroneous historical position information may be removed by means of image filtering and denoising, thereby further improving the road detection accuracy.

In some alternative implementations of the present embodiment, if the historical positions are excessive, the historical positions may be sampled, and the historical position information may include a longitude and a latitude of a historical position. After the latitude and longitude coordinates are subject to Mercator coordinate transformation, a whiteboard layer may be established, a historical position is mapped to the whiteboard layer by coordinates to obtain a distribution map of the historical position or the sampled historical position, and then a layer in the historical position distribution map and a layer in an image of a predetermined region may be aligned according to coordinates. According to the principle of statistics, when historical positions in a region are dense enough, the distribution of such historical positions tends to be stable. In this case, the distribution of historical positions has a strong correlation with the distribution of roads in the region, that is, a region with densely distributed historical positions is considered as a region with a large probability that the region belongs to road. Therefore, a probability that a region corresponding to each pixel in the image is a road region may be obtained on the basis of the historical position information. Then a linear interpolation model may be established to correct an image segmentation result according to the historical position information.

The method provided by the embodiments above of the present disclosure improves the road detection accuracy by acquiring an image of a predetermined region; semantically segmenting the image to acquire a first probability that a region corresponding to each pixel in the image is a road region; acquiring a historical position information set of a target terminal; correcting, in response to historical position information existing in the historical position information set, the historical position information indicating a historical position located in the predetermined region, the first probability according to the historical position information to obtain a second probability; and lastly determining a region corresponding to a pixel having the second probability greater than a preset threshold as a road region.

Figure 3:
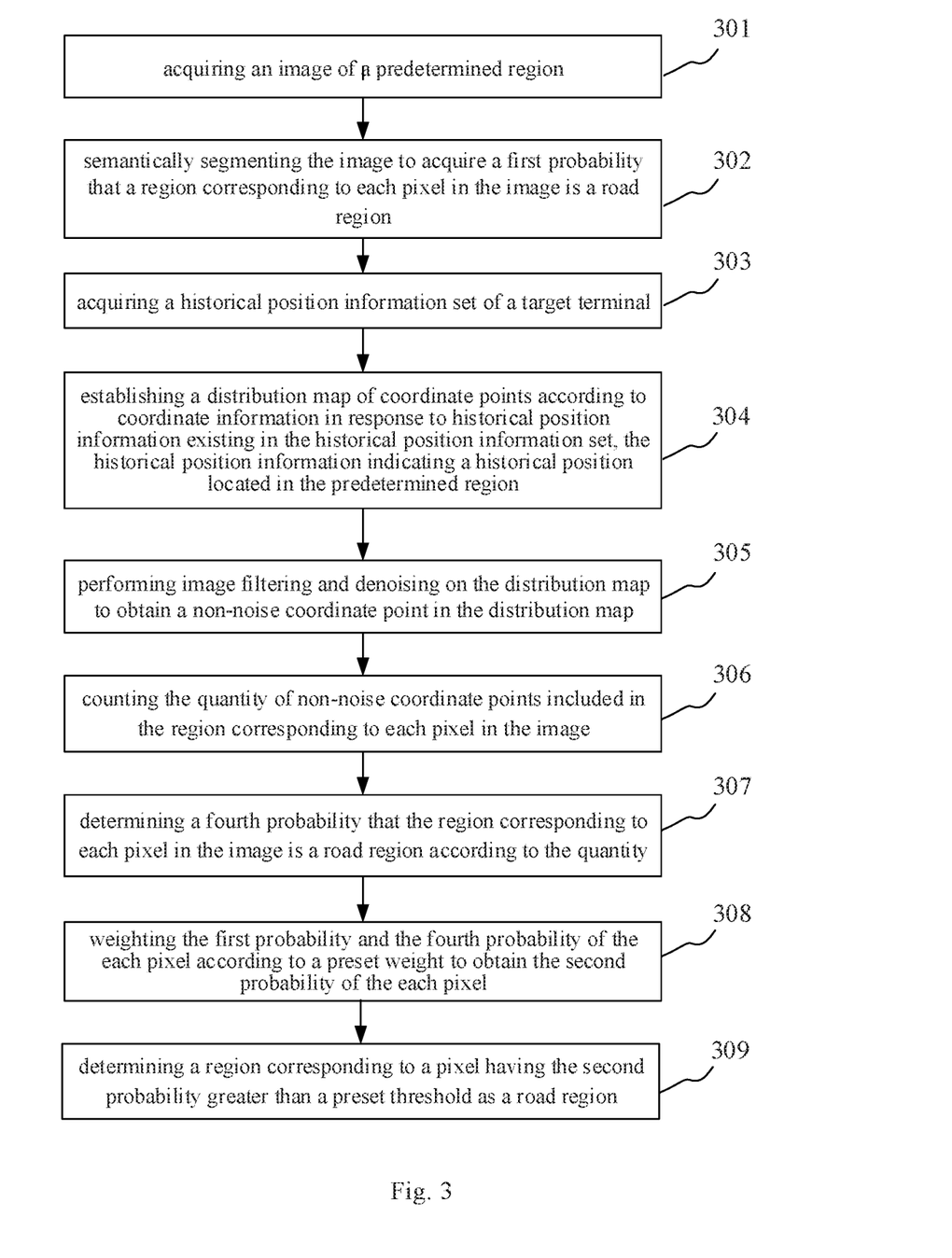
FIG. 3 is a schematic flowchart of another embodiment of a road detection method according to the present disclosure.

Referring to FIG. 3, it is a schematic flowchart of another embodiment of a road detection method according to the present embodiment.

In FIG. 3, a flow 300 of the road detection method comprises the following steps:

Step 301: acquiring an image of a predetermined region.

In the present embodiment, an electronic device (for example, a server as shown in FIG. 1) on which the road detection method is applied may acquire an image of a predetermined region first.

Step 302: semantically segmenting the image to acquire a first probability that a region corresponding to each pixel in the image is a road region.

In the present embodiment, the electronic device may perform semantic segmentation on the image acquired in step 301 to obtain a first probability that a region corresponding to each pixel in the image is a road region.

Step 303: acquiring a historical position information set of a target terminal.

In the present embodiment, the electronic device may acquire a historical position information set of a target terminal.

Step 304: establishing a distribution map of coordinate points according to coordinate information in response to historical position information existing in the historical position information set, the historical position information indicating a historical position located in the predetermined region.

In the present embodiment, the historical position information includes coordinate information uploaded by the target terminal within a predetermined period, and the electronic device may establish a distribution map of coordinate points according to coordinate information in response to historical position information existing in the historical position information set acquired in step 303, the historical position information indicating a historical position located in the predetermined region. The predetermined period may be the last week, or the last 1 to 3 months, and the specific values may be set according to actual needs. The coordinate information may be latitude and longitude. After Mercator coordinate transformation is performed on the latitude and longitude coordinates, each coordinate point may be mapped to a coordinate of a predetermined region. And then the coordinate points are sampled, a whiteboard layer is created, and the coordinate points are mapped to the whiteboard layer.

Step 305: performing image filtering and denoising on the distribution map to obtain a non-noise coordinate point in the distribution map.

In the present embodiment, the electronic device may perform image filtering on the distribution map as established in step 304 to obtain a non-noise coordinate point in the distribution map. Since the target terminal may also upload position information when it is in an off-road region, and a positioning system may also be offset in position, these noise spots need to be removed to prevent the detection result from being affected. The distribution map may be subject to image filtering and denoising by means of Wiener filtering and wavelet filtering. Some machine-based learning, optimization or probability model methods may also be used in image denoising to remove noise points.

Step 306: counting the quantity of non-noise coordinate points included in the region corresponding to each pixel in the image.

In the present embodiment, the electronic device may count the quantity of non-noise coordinate points, as obtained in step 305, included in the region corresponding to each pixel in the image. If a distribution map, as established in step 304, of the coordinate points is consistent with the coordinates of the image, the quantity of non-noise coordinate points included in the region corresponding to each pixel in the image may be counted directly. If they are not consistent, a common coordinate system may be selected. For example, the quantity of non-noise coordinate points included in the region corresponding to each pixel in the image may be counted according to a longitude and latitude range of each pixel in the image as well as a longitude and a latitude of each non-noise coordinate point.

Step 307: determining a fourth probability that the region corresponding to each pixel in the image is a road region according to the quantity.

In the present embodiment, the electronic device above may determine a fourth probability that the region corresponding to each pixel in the image is a road region according to the quantity counted in step 306. According to the principle of statistics, when the non-noise coordinate points in a region are dense enough, the distribution of such non-noise coordinate points tends to be stable. In this case, the distribution of non-noise coordinate points has a strong correlation with the distribution of roads in the region, that is, a region with densely distributed non-noise coordinate points is considered as a region with a large probability that the region belongs to road. A correspondence between the quantity of non-noise coordinate points included in a region corresponding to a pixel and a fourth probability that the region corresponding to pixel is a road region may be established in advance. For example, when the quantity is 0, the fourth probability is 0. When the number is greater than 9 but less than 15, the fourth probability is 0.7. The specific value may be set according to the total quantity of non-noise coordinate points and an aggregation extent of the non-noise coordinate points. Alternatively, the optimal correspondence may also be obtained by training with a machine-based learning method with the verified network data in the map software as training data.

Step 308: weighting the first probability and the fourth probability of the each pixel according to a preset weight to obtain the second probability of the each pixel.

In the present embodiment, the electronic device may weight the first probability obtained in step 302 and the fourth probability determined in step 307 to obtain the second probability according to a preset weight. A linear interpolation model may be established to weight the first probability and the fourth probability of the each pixel according to a preset weight so as to obtain the second probability of the each pixel.

$$p(x)=\lambda p_1(x)+(1-\lambda)p_2(x);$$

where, $p_1(x)$ is a first probability obtained by semantically segmenting a pixel in an image, and $p_2(x)$ is a fourth probability obtained according to the quantity of coordinate points within a region of the pixel. $\lambda$ is a parameter with a value range of [0, 1], and the value thereof is related to an intensity of historical positions in a predetermined region. Intuitively, if the non-noise coordinate points are dense in the predetermined region (for example, the quantity of non-noise coordinate points in the predetermined region is large), the value of the $\lambda$ may be small.

Step 309: determining a region corresponding to a pixel having the second probability greater than a preset threshold as a road region.

In the present embodiment, the electronic device may determine a region corresponding to a pixel having the second probability obtained in step 308 and greater than a preset threshold as a road region.

The implementation details and technical effects of steps 301-303 and step 309 may refer to the descriptions about steps 201-203 and step 205, and will not be described herein again.

Figure 4:
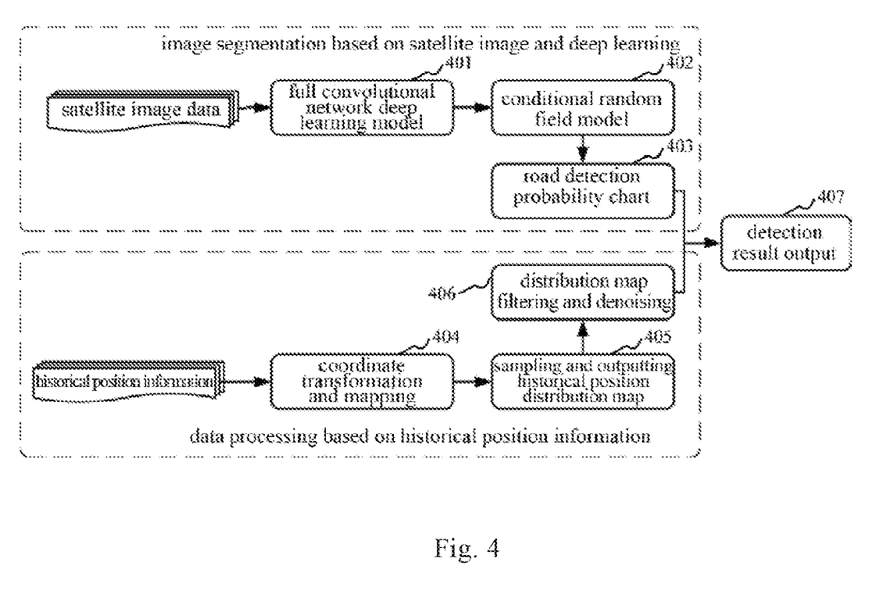
FIG. 4 is a schematic diagram of an application scene of a road detection method according to the present disclosure.

Referring further to FIG. 4, it is a schematic diagram of an application scene of a road detection method according to the present embodiment. In the application scene as shown in FIG. 4, a road detection process is divided into two phases, one is image segmentation based on satellite image and deep learning and the other is data processing based on historical position information. The image segmentation stage based on satellite image and deep learning comprises a step 401 of segmenting an image through a fully convolutional network deep learning model, a step 402 of optimizing an image segmentation result through a conditional random field model and a step 403 of generating a road detection probability chart, wherein the training data of the full convolutional network deep learning model may be a satellite image of a region with verified network data in the map software and a network data label corresponding thereto. If the map software uses a grid map, the label is a rasterized network data label. If the map software uses a vector map, the label is a vectorized network data label. The data processing stage based on historical position information includes a step 404 of performing coordinate transformation and mapping on the historical position information, a step 405 of sampling and outputting a historical position distribution map, a step 406 of performing filtering and denoising on a distribution map (if the quantity of historical position s in step 405 is small, sampling may not be required, and a historical position distribution map is directly output), and a step 407 of outputting a final road detection result by integrating the results of the two stages above.

It can be seen from FIG. 3 that the flow 300 of the road detection method in the present embodiment highlights the step of correcting the first probability according to the historical position information compared with the corresponding embodiment as shown in FIG. 2. Therefore, the solution described in the present embodiment further improves the road detection accuracy.

Figure 5:
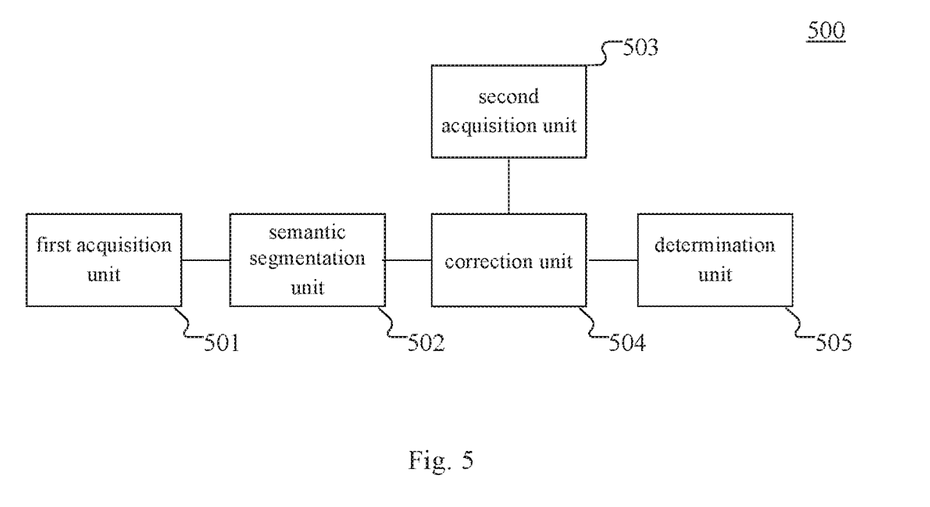
FIG. 5 is an exemplary structure chart of an embodiment of a road detection apparatus according to the present disclosure.

Referring further to FIG. 5, as an implementation of the method above, the present disclosure provides an embodiment of a road detection apparatus, the apparatus embodiment corresponds to the method embodiment as shown in FIG. 2, and the apparatus may specifically be applied to a variety of electronic devices.

As shown in FIG. 5, a road detection apparatus 500 according to the present embodiment comprises: a first acquisition unit 501, a semantic segmentation unit 502, a second acquisition unit 503, a correction unit 504 and a determination unit 505, wherein the first acquisition unit 501 is configured for acquiring an image of a predetermined region; the semantic segmentation unit 502 is configured for semantically segmenting the image to acquire a first probability that a region corresponding to each pixel in the image is a road region; the second acquisition unit 503 is configured for acquiring a historical position information set of a target terminal; the correction unit 504 is configured for correcting, in response to historical position information existing in the historical position information set, the historical position information indicating a historical position located in the predetermined region, the first probability according to the historical position information to obtain a second probability; and the determination unit 505 is configured for determining a region corresponding to a pixel having the second probability greater than a preset threshold as a road region.

In the present embodiment, the specific processing of the first acquisition unit 501, the semantic segmentation unit 502, the second acquisition unit 503, the correction unit 504 and the determination unit 505 may refer to the detailed descriptions about the corresponding embodiment step 201, step 202, step 203, step 204 and step 205 in FIG. 2, and will not be described herein again.

In some alternative implementations of the present embodiment, the semantic segmentation unit 502 comprises: a fully convolutional network model subunit (not shown in the figure), configured for importing the image into a pre-trained fully convolutional network model to obtain a third probability that a region corresponding to each pixel in the image is a road region; and a conditional random field model subunit (not shown in the figure), configured for determining the first probability according to the third probability and a pre-trained conditional random field model with each pixel in the image as a node in a conditional random field and a relation between pixels in the image as an edge in the conditional random field.

In some alternative implementations of the embodiment, the historical position information includes a coordinate information uploaded by the target terminal within a predetermined period; and the correction unit 504 comprises: a counting subunit (not shown in the figure), configured for counting the quantity of coordinate points as indicated by the coordinate information included in a region corresponding to each pixel in the image; a determination subunit (not shown in the figure), configured for determining a fourth probability that the region corresponding to each pixel in the image is a road region according to the quantity; and a weighting subunit (not shown in the figure), configured for weighting the first probability and the fourth probability of the each pixel according to a preset weight to obtain the second probability of the each pixel.

In some alternative implementations of the present embodiment, the counting subunit (not shown in the figure) comprises: an establishment module (not shown in the figure), configured for establishing a distribution map of the coordinate points according to the coordinate information; a filtering module (not shown in the figure), configured for performing image filtering and denoising on the distribution map to obtain a non-noise coordinate point in the distribution map; and a counting module (not shown in the figure), configured for counting the quantity of non-noise coordinate points included in the region corresponding to each pixel in the image.

In some alternative implementations of the present embodiment, the second acquisition unit 503 is further configured for acquiring a position information set uploaded when a preset process and/or a preset thread in the target terminal are started, wherein the preset process and the preset thread are used for realizing a navigation function.

It can be seen from FIG. 5 that the road detection apparatus 500 in the present disclosure improves the road detection accuracy by acquiring an image of a predetermined region; semantically segmenting the image to acquire a first probability that a region corresponding to each pixel in the image is a road region; acquiring a historical position information set of a target terminal; correcting, in response to historical position information existing in the historical position information set, the historical position information indicating a historical position located in the predetermined region, the first probability according to the historical position information to obtain a second probability; and lastly determining a region corresponding to a pixel having the second probability greater than a preset threshold as a road region.

Figure 6:
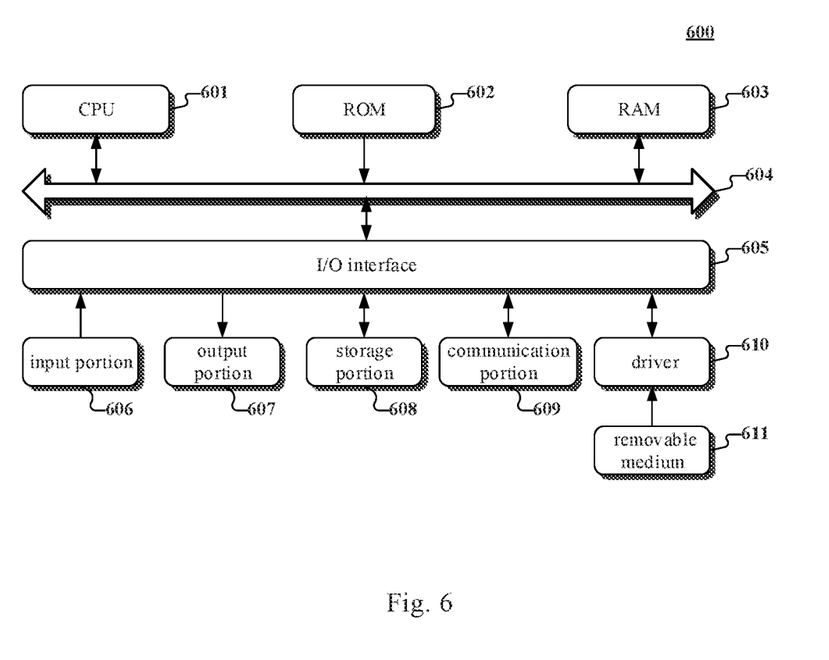
FIG. 6 is a structural diagram of a computer system of a server for realizing an embodiment of the present disclosure.

FIG. 6 is a structural diagram of a computer system 600 suitable for implementing a server according to an embodiment of the present disclosure. The server shown in FIG. 6 is merely an example, and shall not impose any limitation on the function and the scope of use of the present embodiment of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a first acquisition unit, a semantic segmentation unit, a second acquisition unit, a correction unit and a determination unit, where the names of these units or modules do not in some cases constitute a limitation to such units or modules themselves. For example, the first acquisition unit may also be described as "a unit for acquiring an image of a predetermined region".

In another aspect, the present application further provides a non-volatile computer-readable storage medium. The non-volatile computer-readable storage medium may be the non-volatile computer storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to: acquire an image of a predetermined region; semantically segment the image to acquire a first probability of a region corresponding to each pixel in the image being a road region; acquire a historical position information set of a target terminal; correct, in response to historical position information existing in the historical position information set, the historical position information indicating a historical position located in the predetermined region, the first probability according to the historical position information to obtain a second probability; and determine a region corresponding to a pixel having the second probability greater than a preset threshold as a road region.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A road detection method, comprising:
acquiring an image of a predetermined region;
semantically segmenting the image to acquire a first probability of a region corresponding to each pixel in the image being a road region;
acquiring a historical position information set of a target terminal;
correcting, in response to historical position information of the target terminal existing in the historical position information set, the historical position information of the target terminal indicating a historical position of the target terminal located in the predetermined region, the first probability according to the historical position information of the target terminal to obtain a second probability, wherein the historical position information of the target terminal includes coordinate information uploaded by the target terminal within a predetermined period; and determining a region corresponding to a pixel having the second probability greater than a preset threshold as a road region.

2. The method according to claim 1, wherein the semantically segmenting the image to acquire a first probability of a region corresponding to each pixel in the image being a road region comprises:

importing the image into a pre-trained fully convolutional network model to obtain a third probability of a region corresponding to the each pixel in the image being a road region; and determining the first probability according to the third probability and a pre-trained conditional random field model with the each pixel in the image as a node in a conditional random field and a relation between pixels in the image as an edge in the conditional random field.

3. The method according to claim 1, wherein the correcting the first probability according to the historical position information to obtain a second probability comprises:

counting a quantity of coordinate points as indicated by the coordinate information included in a region corresponding to the each pixel in the image;

determining a fourth probability of the region corresponding to the each pixel in the image being a road region according to the quantity; and weighting the first probability and the fourth probability of the each pixel according to a preset weight to obtain the second probability of the each pixel.

4. The method according to claim 3, wherein the counting a quantity of coordinate points as indicated by the coordinate information included in a region corresponding to the each pixel in the image comprises:

establishing a distribution map of the coordinate points according to the coordinate information;

performing image filtering and denoising on the distribution map to obtain a non-noise coordinate point in the distribution map; and counting a quantity of non-noise coordinate points included in the region corresponding to the each pixel in the image.

5. The method according to claim 1, wherein the acquiring a historical position information set of a target terminal comprises:

acquiring a position information set uploaded when a preset process and/or a preset thread in the target terminal are started, wherein the preset process and the preset thread are used for realizing a navigation function.

6. A road detection apparatus, comprising:

at least one processor; and a memory storing instructions, which when executed by the at least one processor, cause the at least one processor to perform operations, the operations comprising:

acquiring an image of a predetermined region;

semantically segmenting the image to acquire a first probability of a region corresponding to each pixel in the image being a road region;

acquiring a historical position information set of a target terminal;

correcting, in response to historical position information of the target terminal existing in the historical position information set, the historical position information of the target terminal indicating a historical position of the target terminal located in the predetermined region, the first probability according to the historical position information of the target terminal to obtain a second probability, wherein the historical position information of the target terminal includes coordinate information uploaded by the target terminal within a predetermined period; and determining a region corresponding to a pixel having the second probability greater than a preset threshold as a road region.

7. The apparatus according to claim 6, wherein the semantically segmenting the image to acquire a first probability of a region corresponding to each pixel in the image being a road region comprises:

importing the image into a pre-trained fully convolutional network model to obtain a third probability of a region corresponding to the each pixel in the image being a road region; and determining the first probability according to the third probability and a pre-trained conditional random field model with the each pixel in the image as a node in a conditional random field and a relation between pixels in the image as an edge in the conditional random field.

8. The apparatus according to claim 6, wherein the correcting the first probability according to the historical position information to obtain a second probability comprises:

counting a quantity of coordinate points as indicated by the coordinate information included in a region corresponding to the each pixel in the image;

determining a fourth probability of the region corresponding to the each pixel in the image being a road region according to the quantity; and weighting the first probability and the fourth probability of the each pixel according to a preset weight to obtain the second probability of the each pixel.

9. The apparatus according to claim 8, wherein the counting a quantity of coordinate points as indicated by the coordinate information included in a region corresponding to the each pixel in the image comprises:

establishing a distribution map of the coordinate points according to the coordinate information;

performing image filtering and denoising on the distribution map to obtain a non-noise coordinate point in the distribution map; and counting a quantity of non-noise coordinate points included in the region corresponding to the each pixel in the image.

10. The apparatus according to claim 6, wherein the acquiring a historical position information set of a target terminal comprises:

acquiring a position information set uploaded when a preset process and/or a preset thread in the target terminal are started, wherein the preset process and the preset thread are used for realizing a navigation function.

11. A non-transitory computer readable storage medium storing a computer program, wherein the program, when executed by a processor, causes the processor to perform the method according to claim 1.

* * * * *